United States Patent Office 3,409,825
Patented Nov. 5, 1968

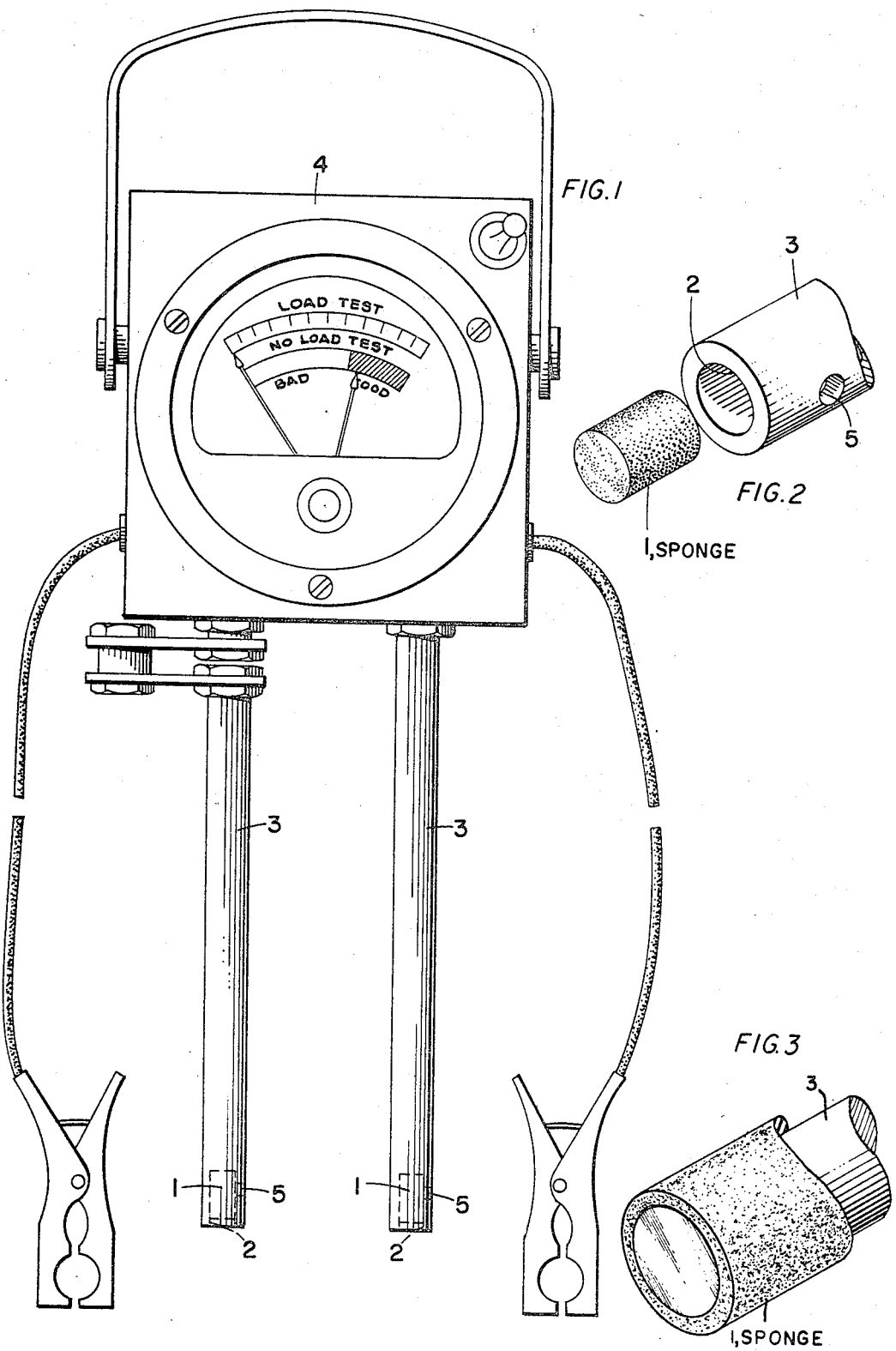

3,409,825
MULTICELL STORAGE BATTERY TESTER HAVING SPONGE-LIKE MATERIAL IN CONTACT WITH EACH PROBE
Frederick H. Hommel, Mentor, Ohio, assignor, by mesne assignments, to ESB Incorporated, Philadelphia, Pa., a corporation of Delaware
Filed Jan. 4, 1966, Ser. No. 518,672
4 Claims. (Cl. 324—29.5)

ABSTRACT OF THE DISCLOSURE

A multicell storage battery tester having a pair of probes adapted to be inserted into the electrolyte of adjacent cells of a multicell battery is improved by having a sponge-like absorbent, electrolyte retaining material in contact with each probe. The probes are kept moist during non-use without being immersed in other liquids by electrolyte retained in the material, and creation of a hard sulfate film on the probes is thus prevented. The material may be in cavities in the probes or may be wrapped around each probe.

---

The present invention relates to a new and improved apparatus for testing multicell storage batteries.

In co-pending application, Ser. No. 387,120, filed Aug. 3, 1964, by William D. Adams for "Method and Apparatus for Testing Storage Batteries" (the Adams application, owned by the assignee of the present application, has since been abandoned) there is described a novel apparatus for testing multicell lead-acid storage batteries. The apparatus there described employs two probes which are inserted in the electrolyte of the cells. My invention consists of improvements in the probes which make the readings obtained by the apparatus more reliable and which make it possible to use the probes without previously soaking them or keeping them continuously immersed.

The battery tester with which this invention is concerned is used with multicell storage batteries. When probes of the tester are inserted into the electrolyte of adjacent cells of the battery, the tester measures the voltage between the probes and also indicates polarity. A low voltage reading between any pair of cells is indicative of battery failure, or of incipient failure, of one or the other of the cells. The tester may be used whether or not the battery is under load. The voltage reading observed is that between the positive plates of one cell discharging against the negative plates of the other cell, with the reaction of the probes cancelling where both probes are of the same material. The battery tester provides a quick, accurate, and reliable indication of battery condition.

In order to obtain consistent readings at all times from the probes disclosed in the Adams application, it has been found to be desirable to keep the probes moist. A film of metallic sulfate forms over the probes when they are initially immersed in the electrolyte, and in time this metallic sulfate will harden if the probes are removed from the electrolyte and permitted to dry. The dried sulfate layer may produce unreliable readings in subsequent uses of the testing apparatus unless the layer is first soaked in electrolyte or water. This soaking time, which may be at least one-half hour, represents time when the apparatus cannot be used. To prevent this hardening it has previously been desirable to keep the probes moist continuously, such as by immersing them in electrolyte or water.

Another difficulty found to be present with the use of the probes in the Adams apparatus is that of polarization of the probes. The probes must necessarily be small in size to fit into the vent openings of the battery cells, and this presents the possibility of high current density on the small surface area of the probe, the high current density causing the probes to be polarized and making readings unreliable.

It is an object of this invention to provide probes which will remain moist for relatively long periods of time after being removed from the electrolyte of the battery and without being immersed in other liquids.

It is a further object to increase the surface area of the probe so that the current density will be reduced and the voltage readings of the apparatus made more reliable.

In the explanation of my invention which follows below, reference will be made to the drawings in which:

FIGURE 1 is a front elevation of a battery tester having two probes.

FIGURE 2 is an enlarged, exploded perspective of the end of one of the probes.

FIGURE 3 is an enlarged perspective view showing portions of a sponge-like material wrapped around one of the probes.

The objects of my invention are achieved by placing a porous membrane 1 in a hollow cavity 2 in the end of each probe 3. The probes 3 are electrically connected to a measuring device 4 which is responsive to a voltage between the two probes. The cavity 2 may be molded or machined in the metal probes 3, and the cavity 2 may be threaded to secure the membrane 1 if that is desired.

Any sponge-like porous material which is not reactive with the electrolyte and which will retain electrolyte may be used for the membrane, illustrative examples of such a material being polyethylene-cellulose fibers, redwood fibers, porous polyethylene, calcium silicate with vinyl resin binder, diatomaceous earth with vinyl resin binder, micro-porous rubber, and polyester resin material.

The membrane 1, when once immersed in the electrolyte of a cell, will retain electrolyte in its interstices for long periods of time, thus preventing hardening of the sulfate film. The retention of electrolyte in the membrane 1 also makes it unnecessary to keep the probes 3 immersed in liquid between tests.

The cavity 2 results in the probes 3 having a greater surface area, and so thereby reduces the current density of the probes 3.

The presence of the porous membrane 1 will also reduce the tendency of the probes 3 to drip electrolyte when they are removed from the cells, and so reduce the likelihood that clothing or metallic parts will be damaged by electrolyte when the probes 3 are removed from the battery cells.

It will be apparent that neither the size, shape, or position of the cavity 2 in the probe is of vital importance so long as the porous membrane 1 is exposed to the electrolyte in the cell. Neither is the number of membranes 1 used with each probe 3 of significance, for any desired number may be used. Likewise the material from which the porous membrane 1 is made is not of crucial significance so long as the material does not adversely affect the chemical reactions within the battery and will retain electrolyte in its interstices after being removed from the battery.

The continued wetting feature of my invention may be achieved by wrapping the sponge-like material around the outside of the probe, in which case the probes need not have cavities as described above.

Where cavities are provided, it may sometimes be helpful to provide additional holes 5 which extend transversely across each probe, connecting the exterior of the probes with the cavities as shown in FIGURE 2. Should gases created by the reaction between the electrolyte and the battery plates collect at the ends of the probes, the gases could escape through the cavities and transverse holes and an air lock could be avoided.

Having described my invention so that those familiar with the art may understand it, I claim:

1. In combination with a multicell storage battery tester wherein a pair of probes adapted to be inserted into the electrolyte of adjacent cells of a multicell battery are electrically connected by means which are responsive to a voltage between the probes, the improvement which comprises a sponge-like absorbent, electrolyte retaining material in contact with each probe.

2. The improvement of claim 1 in which the sponge-like absorbent, electrolyte retaining material is in a cavity in each probe and the cavity has an opening to the outer surface of the probe.

3. The improvement of claim 1 in which the sponge-like absorbent, electrolyte retaining material is in a cavity in each probe and the cavity has at least two openings to the outer surface of the probe.

4. The improvement of claim 1 wherein the sponge-like absorbent, electrolyte retaining material is wrapped around each probe.

References Cited

UNITED STATES PATENTS

| | | | |
|---|---|---|---|
| 1,648,197 | 11/1927 | Roodhouse | 324—65 X |
| 2,064,651 | 12/1936 | Fiene | 324—65 X |
| 2,184,511 | 12/1939 | Bagno et al. | |
| 2,572,597 | 10/1951 | Connor | 324—65 |
| 2,741,912 | 4/1956 | Schultze | 324—65 X |
| 2,793,527 | 5/1957 | Turner et al. | |
| 2,985,827 | 5/1961 | Hasenkamp | 324—30 X |
| 3,287,631 | 11/1966 | Stout | 324—30 |

RUDOLPH V. ROLINEC, *Primary Examiner.*

C. F. ROBERTS, *Assistant Examiner.*